United States Patent [19]

Smith et al.

[11] 4,080,423
[45] Mar. 21, 1978

[54] GAS ABSORPTION

[75] Inventors: Kenneth A. Smith, Manchester, Mass.; Jerry H. Meldon, Odense, Denmark; Clark K. Colton, Newton, Mass.

[73] Assignee: Massachusetts Institute of Technology, Cambridge, Mass.

[21] Appl. No.: 461,636

[22] Filed: Apr. 17, 1974

[51] Int. Cl.$^2$ .................. C01B 17/00; C01B 21/00
[52] U.S. Cl. ................... 423/210; 423/223; 423/226; 423/235; 423/238; 423/242; 423/243; 423/245
[58] Field of Search ............... 423/242–244, 423/238, 352, 223, 226, 227, 235, 239, 210, 245

[56] References Cited

U.S. PATENT DOCUMENTS

| 2,031,802 | 2/1936 | Tyrer | 423/243 |
|---|---|---|---|
| 2,064,838 | 12/1936 | Knapp | 423/242 |
| 2,122,544 | 7/1938 | Girsewald et al. | 423/243 |
| 2,182,305 | 12/1939 | Rosenstein | 423/242 |
| 2,196,004 | 4/1940 | Bacon | 423/242 |
| 2,311,202 | 2/1943 | Barwasser | 423/242 |
| 2,318,523 | 5/1943 | Powell | 423/233 |
| 2,370,020 | 2/1945 | Doumani | 423/243 |
| 2,500,291 | 3/1950 | Liekel et al. | 423/238 |
| 3,507,613 | 4/1970 | Buningh | 423/242 |
| 3,563,695 | 2/1971 | Benson | 423/232 |
| 3,848,057 | 11/1974 | Leder et al. | 423/223 |

FOREIGN PATENT DOCUMENTS

| 578,033 | 5/1932 | Germany | 423/242 |
|---|---|---|---|
| 702,361 | 1/1941 | Germany | 423/242 |
| 1,143,847 | 2/1969 | United Kingdom | 423/242 |

Primary Examiner—O. R. Vertiz
Assistant Examiner—Brian E. Hearn
Attorney, Agent, or Firm—Arthur A. Smith, Jr.; Robert L. Goldberg; David G. Conlin

[57] ABSTRACT

Improved reactive absorbent solutions for absorbing gaseous components are provided by incorporating weakly dissociating compounds in liquid absorbents. When the gaseous component to be dissolved is acid-forming, the absorbent solution should be alkaline, the weakly dissociated compound should be a weak acid or salt thereof, and the pH of the solution should approximate the $pK_A$ of the acid. When the gaseous component is base-forming, the liquid absorbent should be acidic, the weakly dissociating compound should be a weak base, and the pOH of the solution should approximately match the $pK_B$ of the weak base. The weakly dissociated compounds are 1 to 20 times more effective in increasing absorption rates, than additions of equivalent amounts of the primary acidic or basic reactants. Where the absorbed gas is desorbable, the addition of the weakly dissociating compounds has similar effects in increasing the rate of desorption.

16 Claims, No Drawings

GAS ABSORPTION

BACKGROUND OF THE INVENTION

This invention deals with improvements in the absorption of gases, using improved gas absorbents. More particularly it involves improvements in the absorption of gases which form ions upon dissolution in aqueous media.

A large number of gas absorption operations or processes have long been known. Generally they comprise contacting a liquid with a gas in order to transfer a soluble component from the gas phase to the liquid absorbent. Typically, the gas and liquid are contacted countercurrently in plate towers, packed beds, wetted wall columns, spraying systems, or mixers of various types. The intent may be to purify the gas stream, to recover gaseous products or reactants, to react the gaseous component with a material in the absorbent or with the absorbent itself, or to recover the gaseous component for other reasons.

The absorption of a gas into a liquid is caused by the diffusion of solute molecules into the liquid from the gas/liquid interface. Such diffusion is brought about by the random thermal motions of the molecules. Its effect is to redistribute the molecules from regions of higher to regions of lower concentration. It is common to speak of a concentration "driving force" as causing diffusion. This driving force at a given temperature is generally given for gas/liquid systems in terms of the difference between the amount of the component in the gas, as measured by its partial pressure, and the equilibrium pressure for a given amount of gas in the liquid. If the partial pressure of the gas is higher than the equilibrium pressure there will be absorption; if lower, desorption of the gas. Advantage is usually taken of this relationship in regenerating the absorbent liquid and recovering the dissolved gas. For example, gas can be absorbed in a liquid at high pressure, after which the saturated liquid can be exposed to low pressure which will allow the gas to come out of solution.

Where the gaseous component reacts in the absorbent solution, the number of moleucles of the component in solution is reduced as they are consumed by the reaction. Since the reaction reduces the amount of the component in the liquid, the driving force for diffusion of the component into the liquid is enhanced. A large number of processes of this type are known industrially. See Danckwerts, "Gas Liquid Reactions," pp 1 – 5 (McGraw Hill:1970). Some of the more familiar of these include the removal of carbon dioxide from gaseous mixtures by absorption in aqueous alkaline solutions, the removal of sulfur dioxide from flue gases and polluted atmospheres in caustic solutions, the absorption of ammonia in acid solutions, the absorption of hydrogen sulfide in alkali solutions, and others, such as the absorption of cyanic or acetic acid in basic solutions, or the absorption of gaseous organic amines in acid solution.

Because of the enhanced driving force obtained, systems in which the solute reacts in the absorbent are more efficient in absorbing the solute than systems which depend only on the solute's solubility in the absorbent. The controlling factors in reacting or enhanced absorption are the reaction rate and the diffusion rate. Where the reaction takes place slowly, the reaction rate may be the controlling factor in determining the rate of absorption. If the rate of reaction is relatively fast, as in most instances, the absorption rate is controlled by the resistances of the reactants to the diffusion necessary to bring the reactants together. The most common way to increase the rate of absorption in reactive absorbents is to increase the concentration of the reactant in the absorbent. For example, if the gaseous component reacts with $OH^-$ ions in aqueous absorbents, the reaction rate is increased by making the absorbent highly alkaline.

With non-reactive absorbent systems the solute or absorbate can be rather easily stripped or desorbed from the absorbent by purely physical processes. In reaction enhanced systems a second chemical reaction may be required to liberate the absorbed material. Where the first reaction is reversible this is usually not objectionable, since desorption can usually be achieved by placing the solute-bearing absorbent in a physical state which favors the operation of the first reaction in reverse, e.g., by removing unreacted solute from the system. In some instances however, desorption can only be obtained by addition of further reactants to the system or by other, more drastic measures.

While reactive gas absorption systems are much more efficient than purely physical absorption methods, they continue to suffer from a number of difficulties. The normal way to increase absorption rate in reactive systems is to load into the absorbent a greater amount of the reactants which act on the gas. Since such reactants are normally strong acids or bases, this addition results in extremely acidic or extremely alkaline absorbent solutions, which can cause significant corrosion problems with the operating equipment. Further, there is a very real limit as to how high the rate can be increased in such a manner, and the limits imposed by economics are even more stringent. In effect, this means that using reasonably efficient absorbent solutions, e.g. alkaline solutions of a pH of about 12, in presently available equipment, results in the non-absorption of a significant amount of the gaseous component, e.g. sulfur dioxide, which may then be released to pollute the atmosphere. In some cases, other more exotic and expensive systems must be used in order to further reduce the component content of the gas stream. In other cases such further processes are either too expensive or not available, and other restrictions, such as restrictions on burning high sulfur fuels, must be imposed. Other problems exist because of low or inadequate desorption rates in those processes where the solute or the absorbent are recovered or regenerated by desorption.

Accordingly, it is an object of the present invention to provide improved systems for gas absorption. It is a further object to provide systems for gas absorption in which the rate of absorption is substantially increased over certain previously known absorption systems. It is a further object to provide a gas absorption system in which the problems of handling highly concentrated acidic or basic absorbents can be avoided without any substantial loss in absorption. It is a further object to provide a gas absorption system in which the corrsion of the absorption equipment by the absorbent is minimized. It is a further object to provide gas absorption systems which operate at a substantially reduced cost compared to previously known systems. It is a still further object to provide absorbents which give high rates for absorbing such industrial pollutants as sulfur dioxide, hydrogen sulfide, nitrous oxide and other pollutants from the air, and thus provide greater ability to clean and maintain the environment. It is a further object to provide absorbent solutions which not only aid in the rate of absorption, but also aid in the rate of desorption, when the absorbent and/or the solute is to be recovered.

These and other objects and advantages, which will be apparent upon consideration of this disclosure or practice of this invention, are made possible by the use of certain absorbent systems described more fully below.

In accordance with the present invention the rate of absorption of gaseous compounds which react with hydrogen or hydroxyl ions to form ionic specie in aqueous solution is increased by addition of a weakly dissociated compound chosen and added in such an amount that the molar concentration of the hydrogen or hydroxyl ions is approximately numerically equal to the dissociation constant of the weakly dissociated compound. Where the gaseous compound reacts in water to form an acid, the solution in which it is dissolved should be basic and the weakly dissociated compound should be a weak acid or preferably the salt of a weak acid, the $pK_A$ of which approximately matches the pH of the alkaline solution. Where the gaseous component dissolves in water to form a basic solution, the absorbent solution should be acidic, and the weakly dissociated compound should be a weak base or preferably the salt of a weak base whose $pK_B$ matches approximately the pOH of the solution.

The rate increases obtained through the present invention are quite surprising. Depending upon the physical characteristics of the absorbing system and the reactants used, absorption rate increases obtained by addition of the weakly dissociating compound can be from one to as high as 15 or 20 times the rate increase obtained by the addition of an equivalent amount of the primary reactant. For example, in the absorption in sulfur dioxide in aqueous alkali, the normal method of increasing the absorption rate would be by adding an amount e.g. 0.05 mol/l, of additional alkali. The addition of that same amount of a weak acid, the $pK_A$ of which approximately matches the pH of the solution, will normally result in a rate increase which is at least equal to, and as high as 15 to 20 times that caused by addition of further alkali. This discovery allows the use of much less caustic or corrosive absorbents to get the same or even higher rates of absorption. Moreover, the rate increases obtained through the present invention and those obtained by addition of primary reactant are substantially additive, so that if it is more important to absorb greater amounts of the solute than it is to prevent corrosion, a compound with a very low dissociation constant can be used in conjunction with highly concentrated acidic or alkaline solutions to obtain substantially higher absorption rates than were previously possible.

As indicated above, the same or similar results can be obtained by the addition of a weakly dissociating base or its salts to acidic absorbents used to absorb base-forming gaseous components, in which case the pOH of the absorbent is preferably made to match the pK of the weakly dissociating base. Because of the greater industrial importance of systems in which alkaline absorbents are used to absorb acid-forming gases, such systems will be discussed in greater detail, it being understood that equivalent benefits will be obtained from the invention in the acidic absorbent systems.

As a practical matter, the weakly dissociating compound is normally added in the form of its salt, the alkali metal and alkaline earth metal salts being preferred. In alkaline absorbents, for example, the weak acid is normally added as its salt, since addition in acid from decreases the alkalinity of the absorbent slightly, However, rate increases are obtained in either event, and addition in acid form may be preferred in some cases.

Preferably the weak acid has a dissociation constant such that its pK is greater than 7, and the absorbent system is selected and/or adjusted so that the pH of the absorbent is approximately equal to the pK of the weak acid. Of course, in industrial systems such as packed beds, the pH of the absorbent may have considerable variation at different points in the system, e.g. between the top of the bed, where it contacts the gas stream for the first time, and the bottom of the bed, where the absorbent has absorbed a considerable amount of the gaseous component. In such instances, best results are normally obtained where the system is selected and/or adjusted so that the pK of the weak acid used is approximately midway between the pH's encountered at the top and the bottom of the column. With some solute/absorbent systems, however, there may be a pH at which the driving force is minimized. The point at which this minimum occurs is often referred to as the pinch point. When the system has such a pinch point, it normally is preferable to choose a weak acid having a $pK_A$ which is at or near the pH of the pinch point.

Preferably the pH dos not differ from the pK of the acid by more than 1.5 units in alkaline absorbents according to the invention, more preferably not by more than 1.0 units. The highest absorption rates are obtained when the pH of the absorbent is equal to the pK of the acid, plus or minus 0.5 units.

The particular weak acid or salt thereof to be used depends upon the particular system under consideration. As indicated above, the pK of the acid should be above 7.0 although some benefits can be obtained in slightly alkaline absorbents by using a weak acid having a pK somewhat below 7.0, e.g. as low , as 6.0. Acids having pK's between about 8 and 13 are generally preferred in accordance with the present invention, with those having pK's of 9.5 to 12 being highly preferred. It should be noted that absorbent systems having their pH centered on pK's of 9 or higher become increasingly corrosive, and corrosiveness is one of the properties of the absorbent which it is desired to avoid. As indicated previously, the corrosiveness should be balanced against the desired speed of reaction. Organic acids are usable provided that the organic radical does not react or break down to an unacceptable degree under conditions faced in the process. Suitable acids or salts thereof include arsenic acid $H_3A_sO_4$ ($pK_2$ = 6.98, $pK_3$ = 11,50), arsenious acid $HA_sO_3$ (pK = 9.22), boric acid $H_3BO_3$ ($pK_1$ = 9.24, $pK_2$ = 12.74 $pK_3$ = 13.8), carbonic acid $H_2CO_3$ ($pK_2$ = 10.25), germanic acid $H_2GeO_3$ ($pK_1$ = 8.5-9.5, $pK_2$ = 12.72), hydrosulfuric acid $H_2S$ ($pK_1$ = 6.88, $pK_2$ = 14.15), hypobromous acid HBrO (pK = 8.62), hypochlorous acid HClO (pK = 7.50), hypoiodous acid HIO (pK = 10.64), phosphoric acid, $H_3PO_4$ ($pK_2$ = 7.20, $pK_3$ = 12.36), pyrophosphoric acid $H_4P_2O_7$ ($pK_4$ = 8.21), silicic acid, $H_2SiO_3$ ($pK_1$ = 9.77, $pK_2$ = 11.80), and sulfurous acid, $H_2SO_3$ ($pK_2$ = 7.20). Aluminum hydroxide (pK = 12.2) can act as either a weak acid or a weak base. Weak acids which may themselves form gases which may desorb when faced with radical changes in pH, such as carbonic acid, sulfurous acid, hydrogen sulfide, etc., are not preferred as the weak acid in the absorbents of the present invention. Most highly preferred for the purpose of this invention is phosphoric acid and salts thereof, particularly the tertiary salts for very fast absorption rates in very alkaline solutions. At lower pH's, e.g. 8 - 9, pyrophosphoric acid salts also give particularly stable, non corrosive absorbent solutions yet also having high absorption rates. Generally, the amount of weak acid used in the absorbent may vary over wide ranges. Preferably it is present in about 0.05 to 1 mole per mole of base, more preferably from 0.2 to 0.5 moles per mole of base.

It has also been found that the presence of the weak acid in the alkaline absorbent not only aids in the absorption of the gas, but actually aids in the desorption of the gas when the absorbent is rejuvenated. Thus in those systems where it is desired to remove a gas from one stream and deal with it in a more concentrated form somewhere else, the addition of the weak acid aids in the reuse of the absorbent by providing high rates of absorption in the absorption step and high rates of desorption in the step where the gas is removed from the absorbent.

Without wishing to be bound by theory, it is believed that the absorption rate is increased, at least in part, because of the buffering action of the weak acid at or near the gas/liquid interface. Although the reactions of the gas component with hydroxyl ions greatly speeds the absorption rate, it is believed that when the gas is contacted with known alkaline absorbents, concentration gradients are built up as to both $H^+$ and $OH^-$ content in the liquid near the liquid/gas interface. The $OH^-$ content at the interface is lower than the $OH^-$ content in the bulk of the liquid absorbent, because the hydroxyl ions are consumed, almost as soon as they become available, by the incoming $SO_2$ molecules. Likewise, because of the reaction of the $SO_2$ molecules with water, yielding $H^+$ and $HSO_3^-$ ions, there is a higher concentration of $H^+$ ions in the liquid at the interface than in the bulk of the liquid. The reaction rate is decreased because both the $SO_2$ and the $H^+$ compete for reaction with whatever $OH^-$ becomes available via diffusion to the interface from the bulk of the liquid absorbent, or from dissociation of water molecules at the liquid/gas interface. The higher concentration of $H^+$ also tends to repress the dissociation of water in the liquid.

When the weak acid of the present invention is present in the system and excess $H^+$ becomes available, either from the dissociation of water or from the direct reaction of the acidforming gas with water, the anion of the weak acid ($A^-$) consumes that excess by reacting with it to form the undissociated weak acid molecule (HA). The weak acid anion does not ordinarily react with the acid forming gas molecules, which are therefore left free to react with available $OH^-$ ions and thus speed absorption. The available $OH^-$ ions are also increased, because the removal of the excess $H^+$ ions by the weak acid tends to spur dissociation of water.

The desorption stage of the cycle involves the buildup of similar, albeit opposite, gradients, and the weak acid is believed to speed desorption by reducing those gradients in a similar manner. Thus the low concentration or partial pressure of the gaseous component in the desorption gas phase forces the reaction with occurred during absorption to reverse, producing gas molecules and $Oh^-$ ions at the interface. A buildup of $Oh^-$ ions occurs at the interface, which slows down that reverse reaction. When a weak acid is present in the liquid, it decreases the $OH^-$ concentration at the interface by dissociating because of the lower $H^+$ concentration to form $H^+$ and $A^-$. The $H^+$ thus produced reacts with the excess $OH^-$ to form water, the $OH^-$ concentration gradient is reduced and the desorption reaction rate is increased because of the lower $OH^-$ concentration at or near the interface.

As mentioned above, the present invention is also applicable to the absorption of base-forming gas in acid absorbents, in which case a weakly dissociating base ($pK_b$ above 7, preferably 8 - 13) is incorporated in the absorbent. As also mentioned above, in that case the weak base is chosen so that its $pK_b$ approximately matches the desired pOH of the system, preferably the pOH being within 1.5 units, more preferably within plus or minus 0.5 - 1.0 units of the $pK_b$. The amount of weak base used may be similar to the amounts of weak acid used in the other system, e.g. 0.05 to 1.0 mole per equivalent preferably 0.2 to 0.5 mole per equivalent of acid in the absorbent. Suitable weak bases include aniline ($pK_b$ = 9.42), beryllium hydroxide, ($pK_b$ = 10.30), hydroxylamine ($pK_b$ = 7.97), o- and p- phenylenediamine (pK = 9.63, 7.96 respectively), phenylhydrazine (pK = 8.80), piperazine (pK = 8.43); pyridine (pK = 8.77) and the o-, m-, and p-toluidenes (pK = 9.48, 9.26 and 8.70 respectively), or aluminum hydroxide, as mentioned above, with hydroxylamine being preferred. It is believed that the weak base in this system works mainly upon the liquid near the liquid/gas interface, in a manner analogous to that described above for the basic absorbent system.

It is particularly surprising that addition of buffer to the reactive absorbents of the present invention has such a pronounced effect on the absorption, in view of the fact that many of the gases absorbed therein themselves produce buffers upon dissolution. For example, when sulfur dioxide is dissolved in alkaline solution, bisulfite ions are produced by reaction between sulfur dioxide and hydroxyl ions, or between the sulfur dioxide and water. The bisulfite ion is itself a weak acid with a dissociation constant of about $6.24 \times 10^{-8}$, for the following reaction:

$$HSO_3^- \rightleftharpoons H^+ + SO_3^=$$

The bisulfite ion acts as a buffer, resisting changes in pH, since if excess hydrogen ions appear in the system, the above equation is driven to the left and they are consumed. If excess hydroxyl ions appear in the system, they react with and thus remove the hydrogen ions, driving the above equation to the right. It was not expected that the presence of an additional, different buffering compound in an absorbent which already contained a buffer would produce the substantial increases in absorption rate obtained through the present invention.

It should be noted that certain weak acids have been used in absorbents for absorbing carbon dioxide in aqueous media, albeit they were used for other reasons, and/or in considerably different systems. It has been known, for example to include amounts of arsenities or hypochlorites in such absorbents in order to catalyze the rather slow reaction of carbon dioxide in alkaline absorbents. See, e.g., Danckwerts, supra at 244 - 247. However, the use of such catalysts has been restricted to carbon dioxide systems, and no appreciable buffering effect would have been obtained from them, since in order to be useful catalysts they had to be essentially completely ionized. Id., at 245-46. Also, in Edsall and Wyman, "Biophysical Chemistry," Vol. I: 561-71, the authors reported a study of an attempt to simulate the ability of blood to desorb carbon dioxide in the lungs, using an imidazole buffer having a $pK_A$ of about 7.4. It was concluded that carbon dioxide absorbents containing a buffering weak acid were more efficient in taking up and giving off carbon dioxide than a simple bicarbonate system. However, the disclosure of Edsall et al. was strictly confined to the rather peculiar $CO_2$ system, and only that system which approximated actual physiological conditions of pH, strength, etc. It is indicated in Edsall et al. that the effect was optimally obtained for acids having $pK_a$'s of 7 – 8, and minimal effects were indicated for $pK_a$'s greater than 9. There was no suggestion that the same effects could be obtained in other-than-$CO_2$ systems and no reason why the effect was obtained is given so that one might deduce that buffers might be useful in other systems. In German Patent No. 2,215,429, issued Oct. 5, 1972 to Celanese Corporation, (corresponding to later issued French 2,132,034) there is disclosed what is said to be an improved absorbent for carbon dioxide, comprising 0.6 to 4.0 moles of boric acid per mole of potassium hydroxide. This patent is strictly limited to a $CO_2$-$KOH$-$H_3BO_3$ system at low pH's and no suggestion of utility in other systems is derivable from the patent. In sum, none of the prior art discloses or suggests the present invention. See Danckwerts, supra at 129, where it is indicated that in the aqueous absorption of $SO_2$, the absorption rate is decreased by addition of acid or of excess $NaHSO_3$.

The invention will be further understood with regard to the following illustrative embodiments of suitable absorbents which are intended to be purely exemplary.

EXAMPLE 1

The off-gas from a Claus plant for the conversion of $H_2S$ to elemental sulfur contains 1.0 mole % $H_2S$, 0.5 mole % $SO_2$, and 2.0 mole % $CO_2$. The gas is scrubbed with a monoethanolamine solution having a pre-contact pH of 12. The absorbent solution is thereafter regenerated by steam stripping. In accordance with the present invention, the monoethanolamine is augmented by addition of $Na_3PO_4$, in an amount of about 0.25 moles per mole of monoethanolamine.

EXAMPLE 2

The nature of the present invention can be demonstrated by performance of the following procedure. Details of the precise arrangement of the equipment to be used are given in Meldon, Reaction-Enhanced Mass Transfer in Thin Liquid Films, Sc.D. Thesis, M.I.T. (Apr. 20, 1973).

Maintain a liquid film of a thickness of about 60 mils between two silicone rubber membranes (e.g. MEM-213, General Electric Co.) of about 1.71 mils thickness each. A convenient size of membrane is that which gives a surface area of about 25 $cm^2$ for gas transport. One side of the film holder should communicate with a comparatively large volume container, e.g. bout 3 liters, and the other side should communicate with a much smaller size, e.g. 250 c.c. Care should be taken to remove all gases (except water vapor) prior to any experiment, and all volumes should be held at constant temperature.

A run is made by evacuating the volumes, except for water vapor, and admitting $SO_2$ to the larger volume until the partial pressure of $SO_2$ attains a value of about 90 to 95 mm Hg as ascertained by a mercury manometer. Sulfur dioxide will then permeate across the first silicone rubber membrane and be absorbed by the test absorbent. Because of the lack of $SO_2$ in the smaller volume, a driving force for desorption exists between the film of test absorbent and the smaller volume. Therefore the $SO_2$ absorbed from the large volume will be desorbed, and will permeate the second silicone rubber layer and move into the smaller volume. The rate of increase of pressure in the smaller volume is a measure of the relative rate of absorption and desorption for the various absorbents tested.

Tests should be run on the following absorbents: Water alone; 0.15M NaOH; 0.20M NaOH; 0.15M NaOH plus 0.05M $Na_2HPO_4$; 0.15M NaOH + 0.05M $NaAsO_2$; 0.15M NaOH plus 0.05M $Na_4P_2O_7$; 0.15M NaOH plus 0.05M $NaH_2BO_3$; and 0.15M NaOH plus 0.05M $N_aHsiO_3$. The buffer salts may be prepared in situ by the addition of the appropriate acid and the requisite amount of sodium hydroxide. The acid which has a $pK_a$ which is most nearly matched by the pH's of the above absorption solutions is pyrophosporic acid. The same testing procedure can be used to test the invention at higher pH's, to obtain faster reaction rates, simply by using more concentrated hydroxide solutions.

The specific embodiments described herein are meant to be exemplary only, and various modifications will be apparent to those skilled in the art. The claims below are intended to cover all such modifications as fall within the true spirit and scope of the invention.

We claim:

1. A method of absorbing a gaseous component in an aqueous liquid, said component being selected from the group of compounds, other than carbon dioxide, which form an acid when dissolved in said aqueous liquid, comprising contacting said gaseous component with an aqueous liquid, said aqueous liquid consisting essentially of a base and a weakly dissociating compound which dissociates to produce ions which differ from the ions obtainable from the component, said weakly dissociating compound being selected from the group of weak acids and salts thereof, the pH of said aqueous liquid being adjusted to be within about 1.0 unit of the pKa of the weak acid, and said aqueous liquid containing 0.05 to 1 mol of the weakly dissociating compound per mol of base.

2. The method of claim 1, in which said gaseous component is a compound selected from the group of sulfur dioxide, hydrogen sulfide, and nitrous oxide.

3. The method of claim 1, in which the pH of said aqueous liquid is within about 1.5 units of the $pK_a$ of said weakly dissociating compound.

4. The method of claim 1, in which the pH of said aqueous liquid is within about 0.5 units of the $pK_a$ of said weakly dissociating compound.

5. The method of claim 1, in which the pH of said aqueous liquid is from about 8 to about 13.

6. The method of claim 1, in which the pH is from about 9.5 to about 12.

7. The method of claim 1, in which said gaseous component is sulfur dioxide and said weakly dissociating compound is an alkali metal salt of phosphoric acid.

8. A method of absorbing a gaseous component in an aqueous liquid, said component being selected from the group of compounds which form a base when dissolved in said aqueous liquid, comprising contacting said gaseous component with an aqueous liquid having a pH below 7, said aqueous liquid comprising a weakly dissociating compound which dissociates to produce ions which differ from the ions obtainable from the component, said weakly dissociating compound being selected from the group of weak bases and salts thereof, the hydroxide ion concentration in said aqueous liquid being adjusted to be approximately equal to the value of the dissociation constant for the weakly dissociating compound.

9. The method of claim 8, in which the pOH of said aqueous liquid is within about 1.5 units of the $pK_b$ of said weakly dissociating compound.

10. The method of claim 8, in which the pOH of said aqueous liquid is within about 0.5 units of the $pK_b$ of said weakly dissociating compound.

11. The method of claim 8, in which the gaseous component is selected from the group of ammonia and gaseous organic amines.

12. The method of claim 8, in which the weakly dissociating compound is selected from the group of aniline, beryllium hydroxide, hydroxylamine, o-phenylenediamine, p-phenylenediamine, phenylhydrazine, piperazine, pyridine, toluidene and aluminum hydroxide.

13. A method of absorbing a gaseous component in an aqueous liquid, said component being selected from the group of compounds which form an acid when dissolved in said aqueous liquid, said component having solubility in said aqueous liquid such that the absorption curve for said component in said aqueous liquid exhibits a pinch point at a certain pH, comprising contacting said component with said aqueous liquid, said aqueous liquid comprising a basic solution containing a weakly dissociating compound which dissociates to produce ions which differ from the ions obtainable from the component, said weakly dissociating compound being selected from weak acids and salts thereof having a $pK_a$ which is substantially equal to the pH of the pinch point.

14. A method of absorbing a gaseous component in an aqueous liquid, said component being selected from the group of compounds which form a base when dissolved in said aqueous liquid, said component having solubility in said aqueous liquid such that the absorption curve for said component in said aqueous liquid exhibits a pinch point at a certain pOH, comprising contacting said component with said aqueous liquid, said aqueous liquid comprising an acidic solution containing a weakly dissociating compound which dissociates to produce ions which differ from the ions obtainable from the component, said weakly dissociating compound being selected from weak bases and salts thereof having a $pK_b$ which is substantially equal to the pOH of the pinch point.

15. A method of absorbing a gaseous compound in an aqueous liquid, said component being selected from the group of compounds which form a base when dissolved in said aqueous liquid, comprising contacting said gaseous component with an aqueous liquid having a pH below 7, said aqueous liquid comprising a weakly dissociating compound which dissociates to produce ions which differ from the ions obtainable from the component, said weakly dissociating compound being aluminum hydroxide, the hydroxide ion concentration in said aqueous liquid being adjusted to be approximately equal to the value of the dissociation constant for the weakly dissociating compound.

16. The method of claim 15, in which the pOH of said aqueous liquid is within about 1.5 units of the $pK_b$ of said weakly dissociating compound.

* * * * *